United States Patent
Huang

(10) Patent No.: US 7,574,074 B1
(45) Date of Patent: Aug. 11, 2009

(54) METHOD FOR DETECTING CRACKS IN CARBON FIBER BICYCLE FRAME USING EMBEDDED OPTICAL FIBER

(76) Inventor: An-Bin Huang, 20 Alley 1 Ln 16 San Ming Rd, Chiunglin Township, Hsinchu 307 (TW)

( * ) Notice: Subject to any disclaimer, the term of this patent is extended or adjusted under 35 U.S.C. 154(b) by 0 days.

(21) Appl. No.: 12/193,099

(22) Filed: Aug. 18, 2008

(51) Int. Cl.
*G02B 6/00* (2006.01)
(52) U.S. Cl. ............................ 385/12; 385/13; D12/111
(58) Field of Classification Search ............. 385/12–13; D12/111
See application file for complete search history.

(56) References Cited

U.S. PATENT DOCUMENTS

| | | | |
|---|---|---|---|
| 4,922,096 A * | 5/1990 | Brennan | 244/3.16 |
| 6,370,964 B1 * | 4/2002 | Chang et al. | 73/862.046 |
| 7,113,660 B2 * | 9/2006 | Andrews et al. | 385/13 |
| 7,176,448 B2 * | 2/2007 | Ogisu et al. | 250/227.14 |

* cited by examiner

*Primary Examiner*—Charlie Peng
(74) *Attorney, Agent, or Firm*—Alan Kamrath; Kamrath & Associates PA

(57) ABSTRACT

A method for detecting cracks in a carbon fiber bicycle frame using an embedded optical fiber is provided. Optical time-domain reflectometry is employed to detect cracks in a bicycle frame made of carbon fibers intertwining with a single-mode optical fiber. The single-mode optical fiber is thus embedded into the bicycle frame and consolidated with the carbon fibers during a manufacturing process of the bicycle frame. Integration of the single-mode optical fiber, which has a small diameter, low cost and lightweight, into the bicycle frame adds little to a production cost and weight of the bicycle frame. The optical fiber consolidated within the bicycle frame can be connected with an optical time-domain reflectometer for efficiently detecting twists or cracks of the carbon fibers in the bicycle frame, both as a quality check in the manufacturing process and as a safety check after the bicycle frame has been used for some time.

2 Claims, 2 Drawing Sheets

METHOD FOR DETECTING CRACKS IN CARBON FIBER BICYCLE FRAME USING EMBEDDED OPTICAL FIBER

BACKGROUND OF THE INVENTION

1. Technical Field

The present invention relates to a method for detecting cracks in a bicycle frame. More particularly, the preset invention relates to a method for detecting cracks in a carbon fiber bicycle frame using an embedded single-mode optical fiber, wherein the single-mode optical fiber is that widely used in fiber-optic communications, which is made of high-purity silicon and has a predetermined diameter (including an acrylic protective layer). By virtue of its small thickness, lightweight, flexibility and capability of transmitting light signals, the single-mode optical fiber can be used as sensors for sensing strain, temperatures, magnetic fields, acceleration, etc.

2. Description of Related Art

Carbon fibers are well known in the art. When consolidated with a predetermined object, the originally lightweight carbon fibers gain extremely high strength and rigidity. Therefore, carbon fibers have been used in various sports equipments including tennis rackets, golf club shafts and bicycle frames. Before consolidation with other objects, carbon fibers are as soft as cloth. When carbon fibers are used to make a bicycle frame, a carbon fiber fabric is placed in a mold, which is then pressurized internally to push the carbon fiber fabric against the mold. Afterward, epoxy is injected into the mold to consolidate the carbon fiber fabric into a desired shape.

Since carbon fibers can provide extremely high strength and rigidity, only a small quantity is needed to make a lightweight and sturdy bicycle frame, wherein a thickness of a carbon fiber layer in the finished bicycle frame can be smaller than about 1 mm. Hence, if cracks exist in the carbon fibers, strain tends to concentrate and may lead to fracture of the frame. A conventional technique for detecting cracks in carbon fibers involves adding loads onto a consolidated carbon fiber bicycle frame so as to detect any distortion of the bicycle frame, thereby determining the existence of internal cracks in an indirect way.

In addition, cracks in a carbon fiber bicycle frame are often associated with excessive torsion of a carbon fiber fabric when placed in a mold to make the bicycle frame. Therefore, another conventional technique for detecting cracks in carbon fibers is to weave a very fine metal wire into a carbon fiber fabric, and trace the metal wire with an electromagnetic sensing method after the carbon fiber bicycle frame is consolidated, so as to determine whether or not the metal wire is partially twisted by the carbon fiber fabric, and thereby predict the possibility that cracks will someday be formed in the carbon fiber bicycle frame. FIG. 1 shows a conventional carbon fiber bicycle frame 10 and distribution of an optical fiber pierced thereinto. As shown in the drawing, a single-mode optical fiber 20 is routed throughout the entire bicycle frame 10 and an optical fiber connector 30 is left inside a socket 101 designed for receiving a bicycle seat so that when it is desired to detect cracks in carbon fibers of the bicycle frame 10, the bicycle seat is removed from the socket to enable access to the optical fiber connector 30. Afterward, the optical fiber connector 30 can be connected with an optical time-domain reflectometer, whose readings are recorded as a basis for determining the possibility that cracks will eventually be formed in the carbon fiber bicycle frame 10.

However, the conventional techniques described above for detecting cracks in carbon fibers are laborious and time-consuming and cannot directly determine the existence of cracks in a bicycle frame.

BRIEF SUMMARY OF THE INVENTION

In order to overcome the inconvenience associated with the conventional techniques for detecting cracks in carbon fibers, the present invention provides a novel method comprising embedding a single-mode optical fiber into a carbon fiber bicycle frame and using optical time-domain reflectometry to detect cracks in the bicycle frame, so as to increase the efficiency of both a quality check during a manufacturing process of the carbon fiber bicycle frame, and a safety check after the bicycle frame has been used for some time.

A primary objective of the present invention is to consolidate a carbon fiber fabric into a bicycle frame along with a single-mode optical fiber having a predetermined diameter. The single-mode optical fiber is embedded in the bicycle frame in an intertwining manner that resembles the human nerve system. Afterward, the intensity of light reflected from within the optical fiber is sensed at different time points using optical time-domain reflectometry. The intensity of light signals decreases as the single-mode optical fiber conveying the light signals passes through an uneven portion of the carbon fiber fabric or a crack in carbon fibers and thus becomes twisted. Locations of cracks in the bicycle frame can be determined from the speed of light, which is approximately $3 \times 10^8$ m/sec, and the time points when the reflected light shows abnormal decreases. Consequently, defects in the carbon fibers can be located.

BRIEF DESCRIPTION OF THE SEVERAL VIEWS OF THE DRAWINGS

The invention as well as a preferred mode of use, further objectives and advantages thereof will be best understood by referring to the following detailed description of an illustrative embodiment when read in conjunction with the accompanying drawings, wherein.

DETAILED DESCRIPTION OF THE INVENTION

Figure 1:
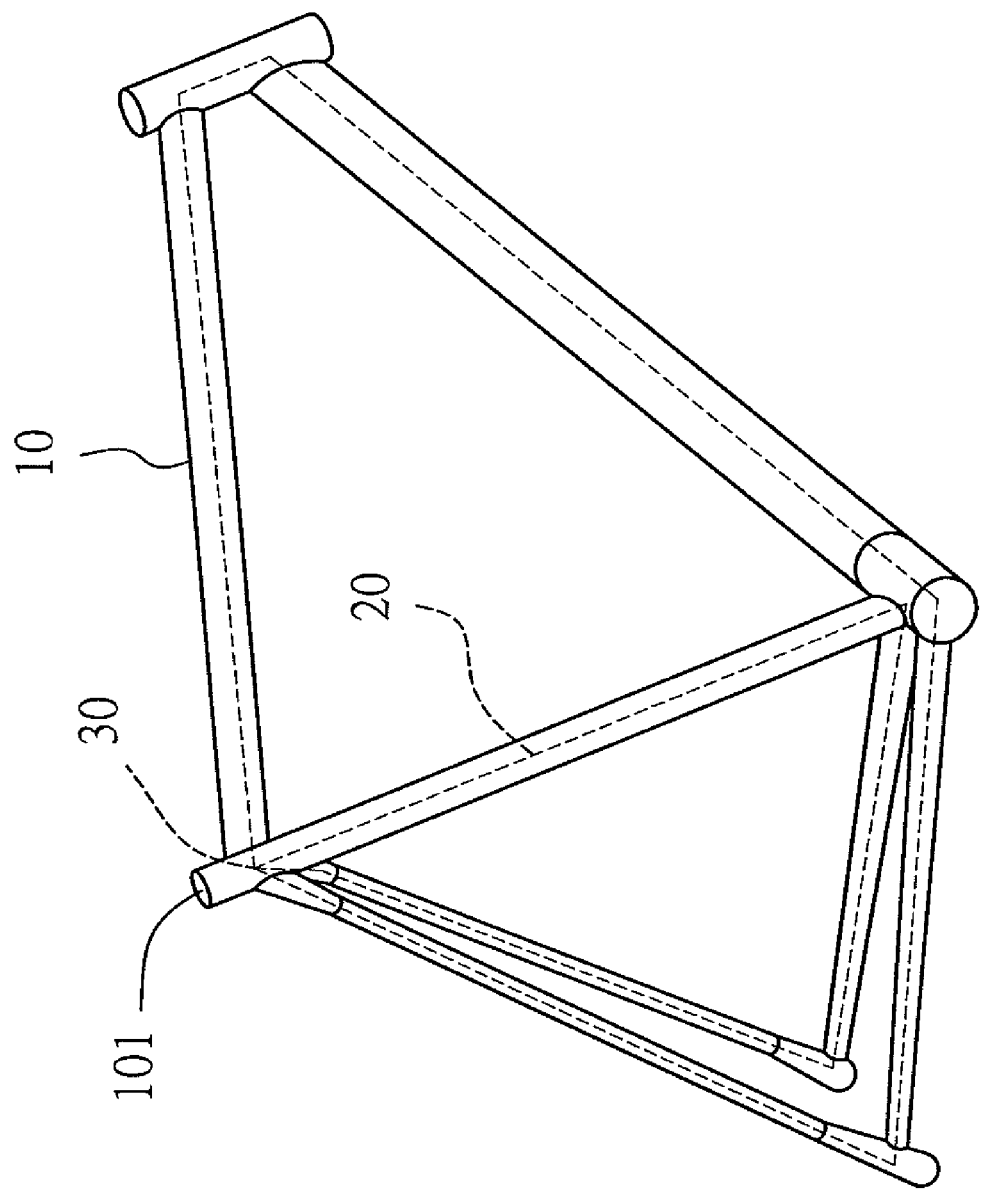
FIG. 1 is a schematic drawing showing a conventional bicycle frame and distribution of an optical fiber pierced thereinto.
Figure 2:
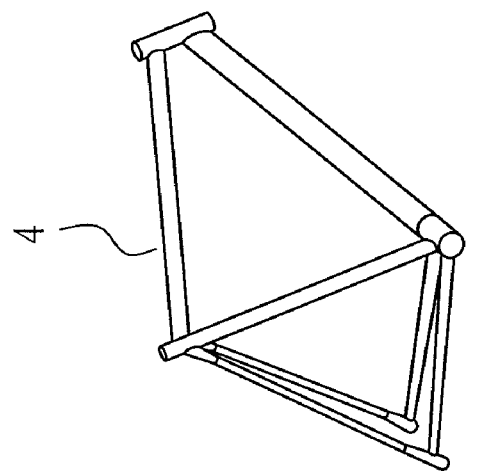
FIG. 2 is a schematic flowchart of embedding a single-mode optical fiber into a carbon fiber bicycle frame.
Figure 2:
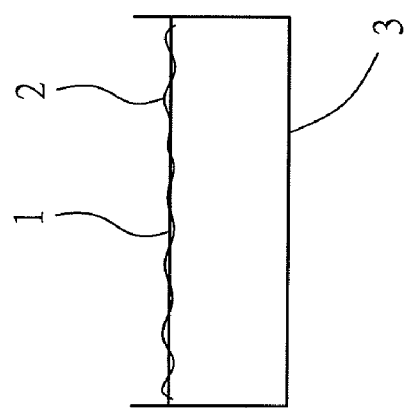
Figure 2:
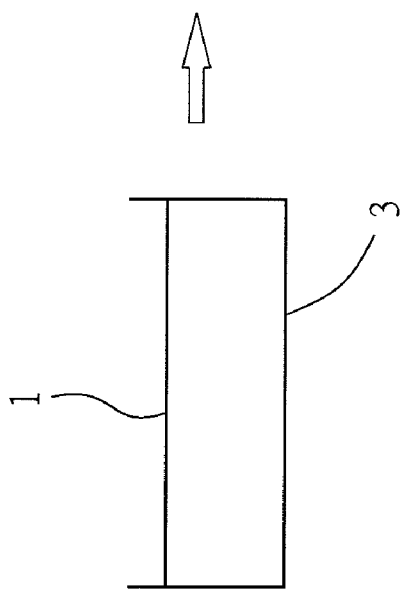

Referring to FIG. 2, a method for detecting cracks in a carbon fiber bicycle frame using an embedded optical fiber comprises embedding a single-mode optical fiber 2 (having a diameter of approximately 250 μm in the present embodiment) into a carbon fiber fabric 1 while the carbon fiber fabric 1 is placed in a mold 3, wherein the single-mode optical fiber 2 is intertwined in the carbon fiber fabric 1 according to a desired route so as to resemble the human nerve system. After a resultant carbon fiber bicycle frame 4 is consolidated, an optical time-domain reflectometer can be connected with the single-mode optical fiber 2 for detecting cracks in the carbon fiber bicycle frame 4. More particularly, the optical time-domain reflectometer reads light signals from the single-mode optical fiber 2 and detects any abrupt decrease of signal intensity resulting from the single-mode optical fiber 2 passing through an uneven portion of the carbon fiber fabric 1 or a crack in carbon fibers. This detecting method can be carried out during mass-production in a factory or as a safety check after a product assembled with the carbon fiber bicycle frame 4 has been used for some time.

According to the present invention, optical time-domain reflectometry is used to sense the intensity of light reflected from within the single-mode optical fiber 2 at different time points, so as to determine whether or not the single-mode optical fiber 2 is twisted while passing through an uneven portion of the carbon fiber fabric 1 or a crack in carbon fibers. The intensity of light signals transmitted through a twisted portion of the single-mode optical fiber 2 will decrease. Therefore, an operator can locate cracks in the bicycle frame 4 according to the time points when the intensity of the reflected light shows an abnormal drop and the speed of light, which is approximately $3 \times 10^8$ m/sec, thereby locating defects in the carbon fibers.

The invention claimed is:

1. A method for detecting cracks in a carbon fiber bicycle frame using an embedded optical fiber, comprising steps of:

embedding a single-mode optical fiber into a carbon fiber fabric when the carbon fiber bicycle frame is manufactured with the carbon fiber fabric, so that the single-mode optical fiber is integrated with carbon fibers in the carbon fiber fabric; and using optical time-domain reflectometry to sense an intensity of light reflected inside the single-mode optical fiber at different time points, so as to locate defects in the carbon fibers according to a speed of light and the time points when the intensity of the reflected light shows an abnormal drop, and thereby locate cracks in the carbon fiber bicycle frame.

2. The method for detecting cracks in a carbon fiber bicycle frame using an embedded optical fiber as claimed in claim 1, wherein the method can be performed as a quality check when the carbon fiber bicycle frame is manufactured or as a safety check after the carbon fiber bicycle frame has been used for a time period.

* * * * *